United States Patent
Kamai et al.

(10) Patent No.: US 9,542,562 B2
(45) Date of Patent: Jan. 10, 2017

(54) DISPLAY SYSTEM, DISPLAY METHOD, DISPLAY TERMINAL AND NON-TRANSITORY COMPUTER-READABLE RECORDING MEDIUM STORED WITH DISPLAY PROGRAM

(71) Applicants: Yasuyuki Kamai, Tokyo (JP); Yoshinori Tanaka, Tokyo (JP)

(72) Inventors: Yasuyuki Kamai, Tokyo (JP); Yoshinori Tanaka, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 133 days.

(21) Appl. No.: 14/253,715

(22) Filed: Apr. 15, 2014

(65) Prior Publication Data
US 2014/0331334 A1    Nov. 6, 2014

(30) Foreign Application Priority Data

May 1, 2013    (JP) .................................. 2013-096467

(51) Int. Cl.
*H04L 29/06*    (2006.01)
*G06F 21/60*    (2013.01)
(Continued)

(52) U.S. Cl.
CPC ............... *G06F 21/604* (2013.01); *G06F 3/14* (2013.01); *G09G 5/14* (2013.01); *G09G 2370/16* (2013.01)

(58) Field of Classification Search
CPC ...... G06F 21/60; G06F 21/604; G06F 21/606; G06F 3/14; H04L 63/104; H04N 21/4126; H04N 21/4751
(Continued)

(56) References Cited

U.S. PATENT DOCUMENTS 7,038,699 B2 *    5/2006    Sato ..................... H04N 5/2224
                                                          345/427
8,750,558 B2 *    6/2014    Lee ........................ G09G 3/003
                                                          380/205
(Continued)

FOREIGN PATENT DOCUMENTS

JP    2006-189476    7/2006
JP    2006-277239    10/2006
(Continued)

OTHER PUBLICATIONS

European Search Report for EP 14163914, mailed Sep. 11, 2014, 10 pgs.
(Continued)

*Primary Examiner* — Hadi Armouche
*Assistant Examiner* — Hee Song
(74) *Attorney, Agent, or Firm* — Squire Patton Boggs (US) LLP

(57) ABSTRACT

A display system for displaying a document includes a tablet terminal and a head mounted display device (HMD). The tablet terminal includes a display device which does not display confidential information that a third party is not allowed to browse, but displays non-confidential information that the third party is allowed to browse with regard to the document. The HMD includes a glasses-type display unit which does not allow the third party to browse, but allows a HMD user to browse, a communication unit which receives the confidential information, and a video camera for capturing the non-confidential information displayed on the display device. The glasses-type display unit, based on the captured non-confidential information, displays the received confidential information so that the received confidential information is visually recognized by the HMD user in a
(Continued)

state of being aligned with the non-confidential information displayed on the display device.

22 Claims, 15 Drawing Sheets

(51) Int. Cl.
*G06F 3/14* (2006.01)
*G09G 5/14* (2006.01)
(58) Field of Classification Search
USPC .................................. 726/26–30; 345/8, 663
See application file for complete search history.

(56) References Cited

U.S. PATENT DOCUMENTS

| | | | |
|---|---|---|---|
| 8,930,368 B2 * | 1/2015 | Furuichi | G06F 17/30707 705/51 |
| 8,966,656 B2 * | 2/2015 | Hirsch | G09C 5/00 380/261 |
| 9,128,520 B2 * | 9/2015 | Geisner | G06F 3/011 |
| 2006/0028400 A1 * | 2/2006 | Lapstun | G02B 26/06 345/8 |
| 2008/0266386 A1 | 10/2008 | Maeda | |
| 2009/0219296 A1 | 9/2009 | Watanabe | |
| 2010/0079356 A1 * | 4/2010 | Hoellwarth | G02B 27/017 345/8 |
| 2010/0328441 A1 | 12/2010 | Wada | |
| 2011/0072355 A1 * | 3/2011 | Carter | G06F 21/84 715/738 |
| 2011/0185437 A1 * | 7/2011 | Tran | H04L 63/104 726/28 |
| 2012/0183137 A1 * | 7/2012 | Laughlin | H04N 7/185 380/200 |
| 2012/0331571 A1 * | 12/2012 | Vandervort | G06F 21/6209 726/30 |
| 2013/0007895 A1 * | 1/2013 | Brolley | G06F 21/62 726/28 |
| 2013/0135180 A1 * | 5/2013 | McCulloch | G06F 3/012 345/8 |
| 2013/0293468 A1 * | 11/2013 | Perez | G06F 3/033 345/158 |
| 2013/0307870 A1 * | 11/2013 | Ashbrook | G06F 21/84 345/629 |
| 2014/0139439 A1 * | 5/2014 | Park | G06F 3/04886 345/169 |

FOREIGN PATENT DOCUMENTS

| | | |
|---|---|---|
| JP | 2007-328196 | 12/2007 |
| JP | 2009/204948 | 9/2009 |
| JP | 2011/010055 | 1/2011 |
| JP | 2011-186856 | 9/2011 |
| JP | 2012-173476 | 9/2012 |

OTHER PUBLICATIONS

Notification of Reason for Refusal dispatched on Mar. 24, 2015, for related Japanese Patent Application No. 2013-096467, 4 pp.
Translation of the Notification of Reason for Refusal dispatched on Mar. 24, 2015, for related Japanese Patent Application No. 2013-096467, 4 pp.
Notification of Reason for Refusal dispatched on Nov. 10, 2015, for related Japanese Patent Application No. 2013-096467, 4 pp.
Translation of the Notification of Reason for Refusal dispatched on Nov. 10, 2015, for related Japanese Patent Application No. 2013-096467, 5 pp.

* cited by examiner

FIG.4  ORIGINAL IMAGE (NORMAL IMAGE)
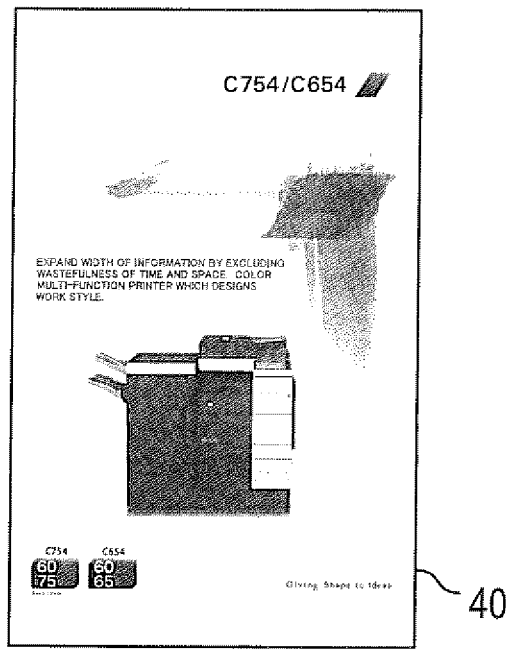
FIG.5  NON-CONFIDENTIAL INFORMATION
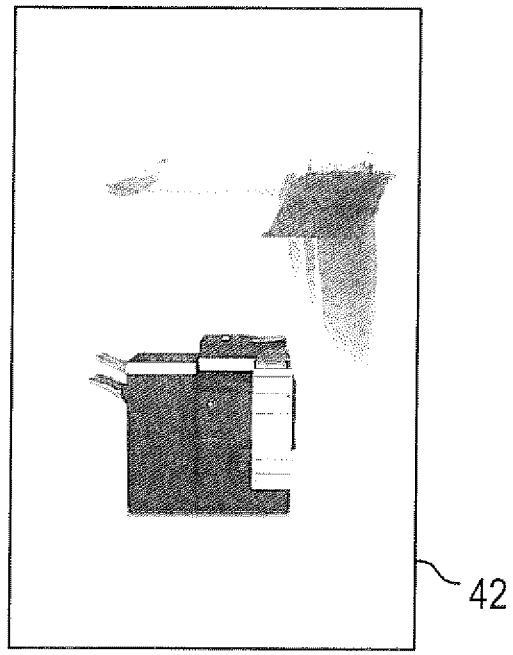

FIG.10
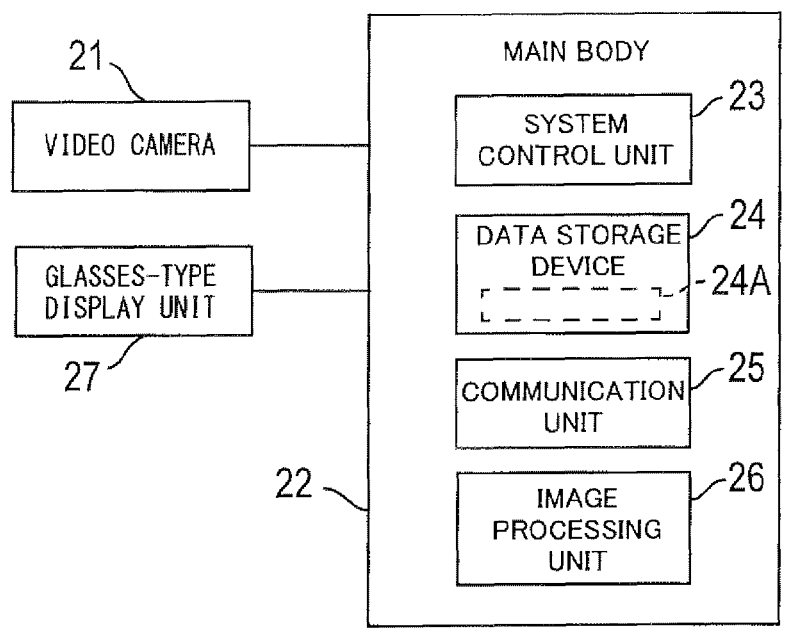
FIG.11  VIDEO CAMERA IMAGE
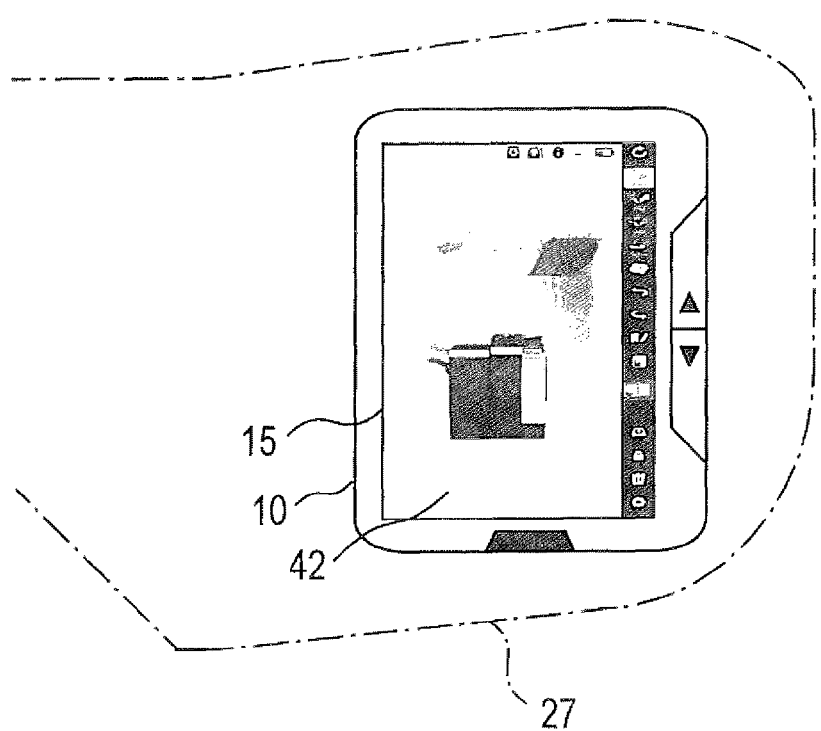

CONFIDENTIAL INFORMATION AFTER VIRTUAL OBJECT PROCESSING

VISUALLY RECOGNIZED IMAGE

FIG.17 REGION ATTRIBUTE SETTING OF TABLET TERMINAL (FIRST DISPLAY TERMINAL)

DISPLAY SYSTEM, DISPLAY METHOD, DISPLAY TERMINAL AND NON-TRANSITORY COMPUTER-READABLE RECORDING MEDIUM STORED WITH DISPLAY PROGRAM

CROSS-REFERENCE TO RELATED APPLICATION

This application is based on Japanese Patent Application No. 2013-096467 filed on May 1, 2013, the contents of which are incorporated herein by reference.

BACKGROUND

1. Technical Field

The present invention relates to a display system, a display method, a display terminal, and a non-transitory computer-readable recording medium stored with a display program.

2. Description of Related Art

Information displayed on a display unit of a display terminal such as a tablet and the like can be visually recognized even by, for example, a third party in addition to a user who is a concerned party by looking into the display unit. Therefore, a disadvantage occurs when information which a third party is not allowed to browse, that is, confidential information, is included in the information displayed on the display unit.

With regard to this disadvantage, for example, a technology disclosed in Japanese Unexamined Patent Application Publication No. 2011-10055, by alternately displaying an image of confidential information and other images in a time-division manner, enables only the concerned party equipped with shutter glasses which open and close a shutter by synchronizing at a time-division timing to visually recognize the confidential information.

In addition, for example, as in a technology disclosed in Japanese Unexamined Patent Application Publication No. 2009-204948, by alternately displaying an image of confidential information and an image of an opposite color which cancels the image of confidential information with different polarizations in a time-division manner, only the concerned party equipped with glasses having a polarization switching unit and a polarization filter which synchronize at a time-division timing can visually recognize the confidential information.

However, a disadvantage occurs when information which a third party is allowed to browse, that is, non-confidential information, is present, and the concerned party and the third party want to share the non-confidential information. For example, in the technology described in Japanese Unexamined Patent Application Publication No. 2011-10055 and Japanese Unexamined Patent Application Publication No. 2009-204948, since different images are alternately displayed on a display unit in a time-division manner, if there is a third party who is not equipped with dedicated glasses, the third party views images in which confidential information and non-confidential information are alternately displayed with an afterimage effect, so that the third party has a disadvantage that it is difficult to correctly understand the non-confidential information.

SUMMARY

The present invention is made in order to solve the abovementioned problems associated with the related art, and aims to provide a display system, a display method, a display terminal, and a non-transitory computer-readable recording medium stored with a display program in which only a concerned party can occupy confidential information, and on the other hand, non-confidential information can be shared between the concerned party and a third party.

To achieve at least one of the abovementioned objects, a display system reflecting one aspect of the present invention comprises a first display terminal, and a second display terminal and is adapted to display a document. The first display terminal includes a first display unit which does not display confidential information that a first user is not allowed to browse, but displays non-confidential information that the first user is allowed to browse with regard to the document. The second display terminal includes a second display unit which does not allow the first user to browse, but allows a second user who is different from the first user to browse, a receiving unit which receives the confidential information, and an imaging device for capturing the non-confidential information displayed on the first display unit. The second display unit, based on the captured non-confidential information, displays the received confidential information so that the received confidential information is visually recognized by the second user in a state of being aligned with the non-confidential information displayed on the first display unit.

It is preferable in the above display system that the second display unit is an optical transmission type, and displays the confidential information by aligning the confidential information with the non-confidential information visually recognized through the second display unit.

It is preferable in the above display system that the second display unit is a video transmission type, and displays an image synthesized by aligning the captured non-confidential information with the confidential information.

It is preferable in the above display system that the first display terminal further includes a determination unit which determines whether an image and/or an object is the confidential information or not, and a transmitting unit which transmits the image and/or the object which has been determined to be confidential information by the determination unit to the second display terminal as confidential information.

It is preferable in the above display system that the second display terminal is a head mounted display device.

To achieve at least one of the abovementioned objects, a display method reflecting another aspect of the present invention is adapted to display a document using a first display terminal and a second display terminal, and comprises steps (a), (B), (C), and (D). In the step (A), non-confidential information is displayed on a first display unit of the first display terminal which does not display confidential information that a first user is not allowed to browse, but displays the non-confidential information that the first user is allowed to browse with regard to the document. In the step (B), the confidential information is received by a receiving unit of the second display terminal. In the step (C), the non-confidential information displayed on the first display unit is captured by an imaging device of the second display terminal. In the step (ID), the received confidential information is displayed on a second display unit of the second display terminal which does not allow the first user to browse but allows a second user different from the first user to browse. Thereby, in the step (D), the received confidential information is displayed so that the received confidential information is visually recognized by the second user in a state of being aligned with the non-confidential information displayed on the first display unit based on the captured non-confidential information.

To achieve at least one of the abovementioned objects, a display terminal reflecting another aspect of the present invention is applied to a display system comprising a first display terminal and a second display terminal for displaying a document as the first display terminal, and comprises: a first display unit which does not display confidential information that a first user is not allowed to browse, but displays non-confidential information that the first user is allowed to browse with regard to the document; a determination unit which determines whether an image and/or an object is the confidential information or not; and a transmitting unit which transmits the image and/or the object which has been determined to be confidential information by the determination unit to a terminal device which is the second display terminal as confidential information. The terminal device comprises: a second display unit which does not allow the first user to browse, but allows a second user who is different from the first user to browse; a receiving unit which receives the confidential information; and an imaging device for capturing the non-confidential information displayed on the first display unit. Thereby, the second display unit, based on the captured non-confidential information, displays the received confidential information so that the received confidential information is visually recognized by the second user in a state of being aligned with the non-confidential information displayed on the first display unit.

To achieve at least one of the abovementioned objects, a non-transitory computer-readable recording medium reflecting another aspect of the present invention is stored with a display program of a display terminal which is applied to a display system comprising a first display terminal and a second display terminal for displaying a document as the first display terminal. The display program causes the display terminal to execute a process comprising procedures (A), (B), and (C). In the procedure (A), it is determined whether an image and/or an object is the confidential information or not by a determination unit of the display terminal. In the procedure (B), with regard to the document, the image and/or the object determined not to be confidential information by the determination unit is displayed on a first display unit of the display terminal which does not display the confidential information that a first user is not allowed to browse but displays the non-confidential information that the first user is allowed to browse as the non-confidential information. In the procedure (C), the image and/or the object which is determined to be confidential information by the determination unit is transmitted to a terminal device which is the second display terminal by a transmitting unit of the display terminal as confidential information. In addition, the terminal device comprises a second display unit which does not allow the first user to browse, but allows a second user different from the first user to browse, a receiving unit which receives the confidential information, and an imaging device which captures the non-confidential information displayed on the first display unit. Thereby, the second display unit, based on the captured non-confidential information, displays the received confidential information so that the received confidential information is visually recognized by the second user in a state of being aligned with the non-confidential information displayed on the first display unit.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 4 is a schematic view of assistance in explaining an original image stored in a data storage device shown in FIG. 3.

FIG. 5 is a schematic view of assistance in explaining a non-confidential information image stored in the data storage device shown in FIG. 3.

FIG. 10 is a block diagram of assistance in explaining the head mounted display device shown in FIG. 1.

FIG. 11 is a schematic view of assistance in explaining an image captured by a video camera shown in FIGS. 9 and 10.

DETAILED DESCRIPTION

Hereinafter, an embodiment of the present invention will be described referring to drawings.

Figure 1:
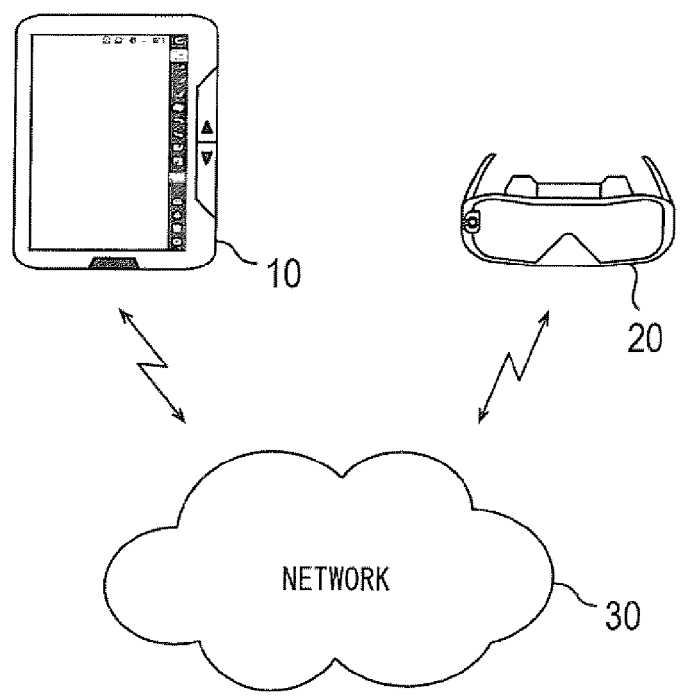
FIG. 1 is a diagrammatic illustration of assistance in explaining a display system according to an embodiment of the present invention.

FIG. 1 is a diagrammatic illustration of assistance in explaining a display system according to an embodiment of the present invention.

A display system according to the embodiment of the present invention is applied so as to display non-confidential information which a third party is allowed to browse and confidential information which the third party is not allowed to browse, and includes a tablet terminal 10, a head mounted display device (HMD) 20, and a network 30 as shown in FIG. 1. In the present embodiment, the tablet terminal 10 and the head mounted display device 20 are a first display terminal and a second display terminal, respectively, and a concerned party is a user who uses the head mounted display device 20, and also serves as a user using the tablet terminal. In the following, a user using the head mounted display device 20 is referred to as a head mounted display device user, and a user using the tablet terminal is referred to as a tablet terminal user. The concerned party serves not only as the tablet terminal user who is also equipped with the head mounted display device 20, but also as a user who is equipped with the head mounted display device 20, but does not operate the tablet terminal 10.

The network 30 includes various types of networks such as a Local Area Network (LAN) which connects a computer and a network device to each other by a standard such as Ethernet (registered trademark), Token Ring, and Fiber-Distributed Data Interface (FDDI), a Wide Area Network (WAN) which connects between LANs using a dedicated line, the Internet, and a combination thereof. A network protocol is, for example, Transmission Control Protocol/Internet Protocol (TCP/IP).

The tablet terminal 10 and the head mounted display device 20 are connected to communicate with each other via an access point which is present in the network 30 by using an infrastructure mode of a wireless LAN. It is also possible to use a wired LAN in a connection of the tablet terminal 10 and the head mounted display device 20 to the network 30.

By using an ad-hoc mode of the wireless LAN, it is also possible to perform a direct connection on the tablet terminal 10 and the head mounted display device 20. Wireless communications such as Bluetooth (registered trademark) which use radio waves in the 2.4 GHz band, or a wired connection such as a serial interface such as a Universal Serial Bus (USB) or a parallel interface such as an Institute of Electrical and Electronics Engineers (IEEE) 1284 can be applied to the direct connection.

Next, a configuration of the tablet terminal 10 will be described in detail.

Figure 2:
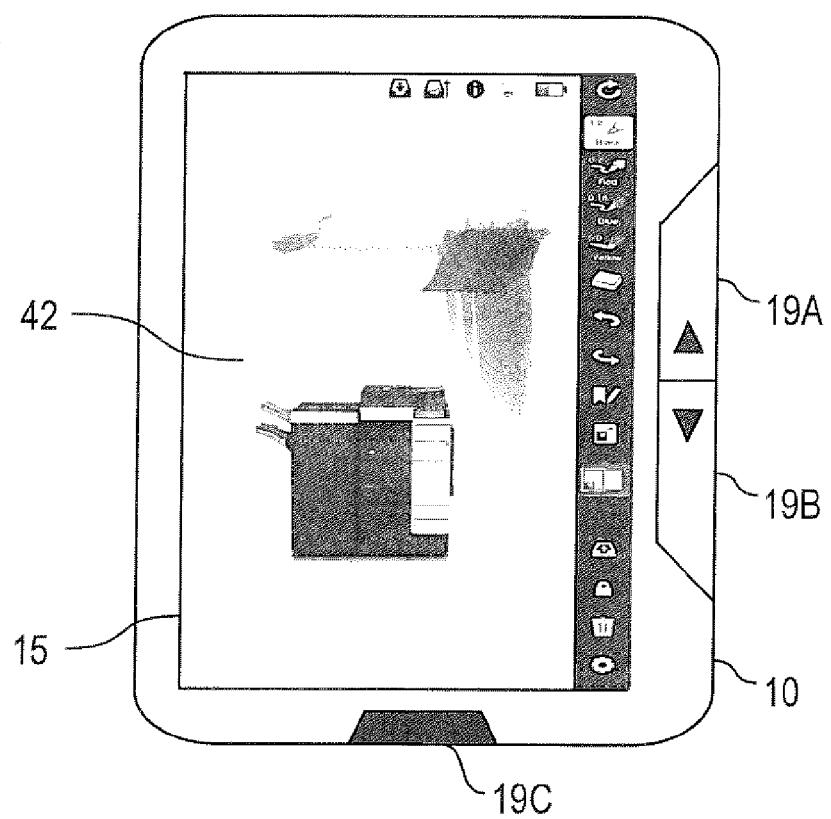
FIG. 2 is an exterior view of assistance in explaining a tablet terminal shown in FIG. 1.
Figure 3:
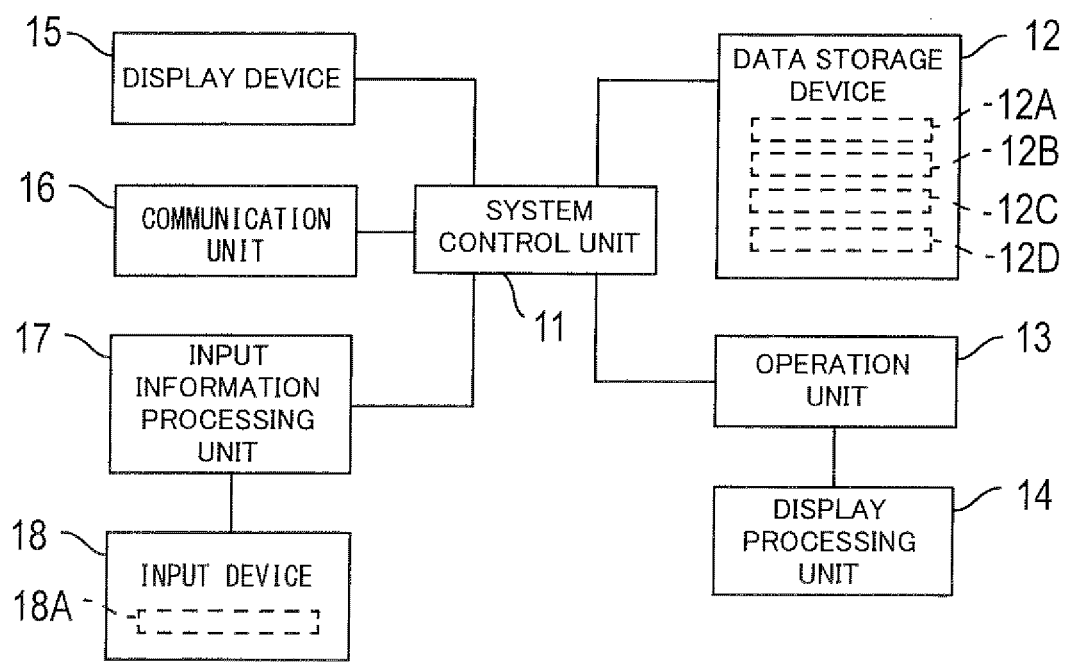
FIG. 3 is a block diagram of assistance in explaining the tablet terminal shown in FIG. 1.
Figure 6:
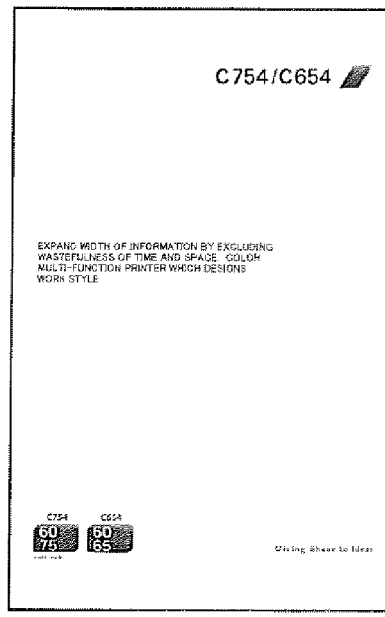
FIG. 6 is a schematic view of assistance in explaining a confidential information image stored in the data storage device shown in FIG. 3.
Figure 7:
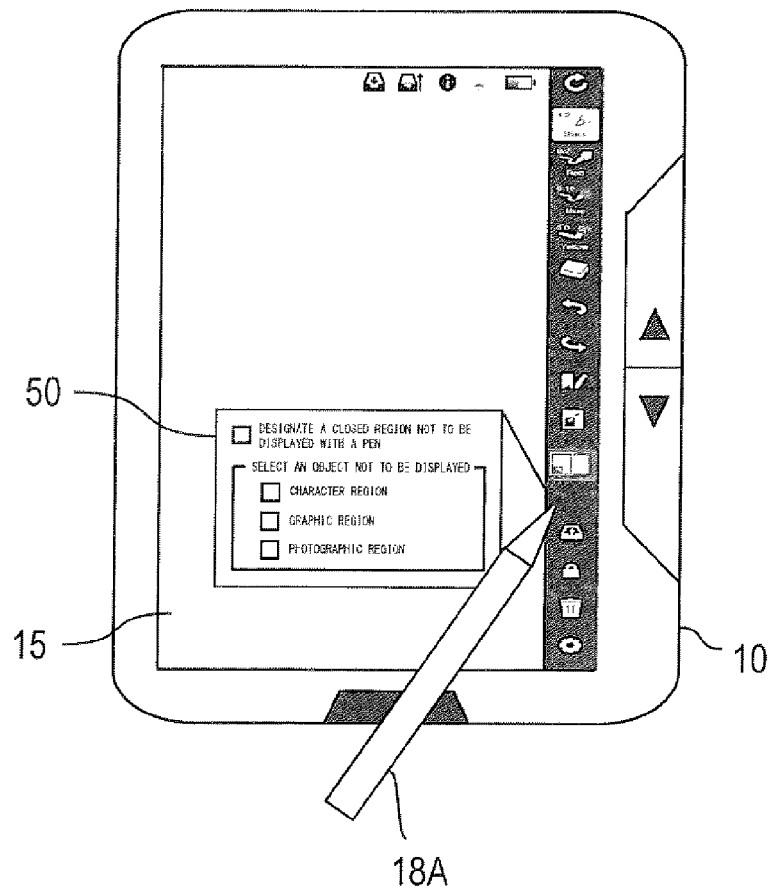
FIG. 7 is a diagram of assistance in explaining an operation menu of the tablet terminal.
Figure 8:
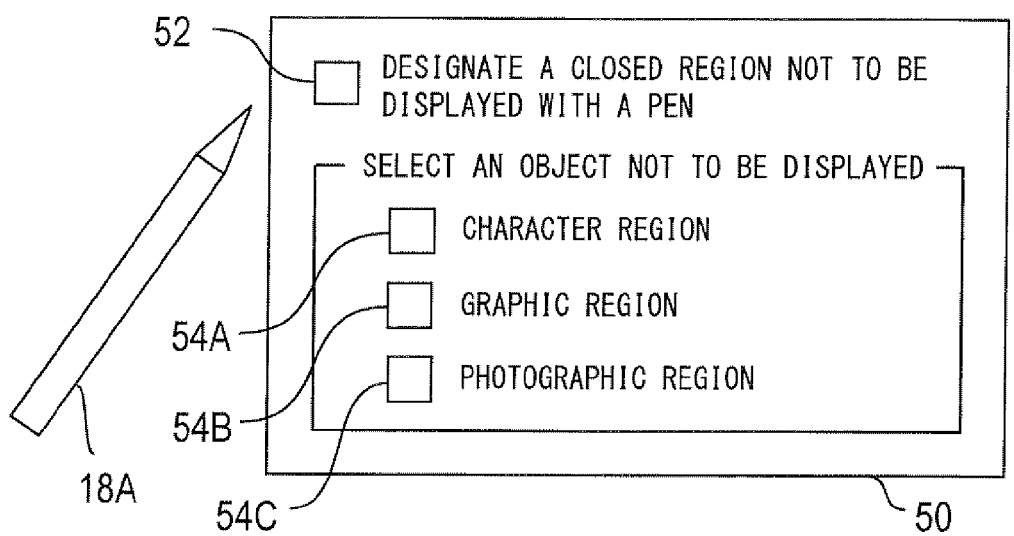
FIG. 8 is an enlarged view of the operation menu shown in FIG. 7.

FIG. 2 is an exterior view of assistance in explaining the tablet terminal shown in FIG. 1, FIG. 3 is a block diagram of assistance in explaining the tablet terminal shown in FIG. 1, FIGS. 4, 5, and 6 are schematic views of assistance in explaining an original image, a non-confidential information image and a confidential information image stored in the data storage device shown in FIG. 2, FIG. 7 is a diagram of assistance in explaining an operation menu of the tablet terminal, and FIG. 8 is an enlarged view of the operation menu shown in FIG. 7.

The tablet terminal 10, as shown in FIG. 3, includes a system control unit 11, a data storage device 12, an operation unit 13, a display processing unit 14, a display device 15, a communication unit 16, an input information processing unit 17, and an input device 18.

The system control unit 11 is a control circuit composed of a microprocessor which performs control of each of the above-mentioned units and various types of operation processing according to programs, etc.

The data storage device 12 is used to store various types of programs and data, and composed of an appropriate combination of a read-only memory (ROM), a random access memory (RAM), a rewritable non-volatile semiconductor memory (for example, flash memory), and the like. For example, a program stored in the ROM is read out and executed by the system control unit 11 (microprocessor) as needed. At this time, the RAM is used as a working area which temporarily stores a program and data necessary for executing the program.

For example, the program includes a display program 12A, an image determination program 12B, a region attribute setting program 12C, and a drawing processing program 12D which are executed by the system control unit 11. The display program 12A is used to display non-confidential information in the display device 15, and transmit an image, which is determined to be confidential information, to the head mounted display device 20. The image determination program 12B is a determination unit which is used to determine whether the image is non-confidential information or confidential information according to a region attribute (to be described below in detail). The region attribute setting program 12C is a region attribute designation unit which is used to designate a region attribute.

For example, the drawing processing program 12D is used to convert document data into bit map data (image data) by Raster Image Processing (RIP). In an example of FIG. 3, the display program 12A, the image determination program (determination unit) 12B, the region attribute setting program (region attribute designation unit) 12C, and the drawing processing program 12D are disclosed as individual programs, respectively. However, there may be one program which realizes all functions of these four programs. For example, the display program 12A may realize all functions of the above-mentioned four programs.

The data are document data which include image data and the like necessary for executing the display program 12A, or settings of region attributes designated by using the region attribute setting program 12C.

In the present embodiment, the document data stored in the data storage device 12 are acquired via the network 30, and are data created in the form of a Page Description Language (PDL) such as PostScript (registered trademark), Printer Control Language (PCL) and the like. It is possible to apply data created by using a document format such as plain text, Portable Document Format (PDF) and the like, or a dedicated format for an electronic book such as electronic publication (EPUB) and the like to the document data.

The document data is not limited to being acquired via the network 30, but can be created on the tablet terminal 10. By incorporating a memory card interface into the tablet terminal 10, it is possible to use the document data stored in a memory card in the tablet terminal 10. For example, the memory card is a SD memory card, a micro SD card, a USB memory (USB flash memory), a memory stick (registered trademark), or a CompactFlash (registered trademark).

The image data include an original image (normal image) 40 shown in FIG. 4, non-confidential information 42 shown in FIG. 5, and confidential information 44 shown in FIG. 6. The original image is an image based on document data stored in the data storage device 12 or the document data created and edited on the tablet terminal 10, and is data which is a source of the non-confidential information 42 and the confidential information 44. The non-confidential information 42 is information of the original image which is shared between a user and a third party, and which the third party is allowed to browse. The confidential information 44 is information of the original image which is associated with the non-confidential information 42 and which a third party is not allowed to browse, and is information which only a user equipped with the head mounted display device is allowed to browse. The user equipped with the head mounted display device is referred to as a head mounted display device user or a HMD user in the following.

In the present embodiment, the non-confidential information 42 and the confidential information 44 are extracted from the original image 40 and, then, it is possible to define the original image 40 as an image which synthesizes the non-confidential information 42 and the confidential information 44. It is also possible to individually prepare the original image 40, the non-confidential information 42, and the confidential information 44.

The region attribute is used to determine whether an image included in the original image 40 is the non-confidential information 42 or the confidential information 44, and is a character region, a graphic region, a photographic region, color, a character region attribute of the character region, and an attribute which combines thereof. The character region attribute includes a caption character, a diagonal line, bold, and an underline.

The operation unit 13 is composed of a touch panel which is integrated with key switches 19A and 19B (refer to FIG. 2) and the display device 15. For example, the key switches 19A and 19B and the touch panel are operated by a tablet terminal user to perform switching of a display content, displaying of an operation menu, and setting of a region attribute. A type of the touch panel is not particularly limited, but it is possible to apply an electrostatic capacitance type or a resistive film type thereto.

The display processing unit 14 is used to execute the drawing processing program by an instruction from the system control unit 11, converts the document data into bit map data, and inputs the bit map data in the display device 15 to be displayed.

The display device 15 is a display unit made from electrophoresis type electronic paper and consumes power when updating a display, but can maintain a display content without consuming power. The display device 15 can be composed of a liquid crystal display, an organic Electro-Luminescence (EL) display, etc.

On the display device 15, the non-confidential information 42 shown in FIG. 5 and the operation menu 50 shown in FIG. 7 are displayed. With regard to the confidential information 44, when the original image 40 is a page of the document data, it is possible to set not only a portion of the page but also the entire page as the confidential information 44. In this case, white paper (blank) is displayed as the non-confidential information 42 on the display device 15.

The operation menu 50 is used to set a region attribute, and includes buttons (check box) 52, 54A, 54B and 54C as shown in FIG. 8. More specifically, the operation menu 50 is used to set a condition for determining which information among information included in the original image to set as confidential information, that is, which information not to display on the tablet terminal 10. The operation menu is used to set a condition for determining which information to set as confidential information.

The button 52 is selected when the tablet terminal user manually designates information not to be displayed on the tablet terminal 10. More specifically, under the condition that the original image is displayed on the tablet terminal, the button 52 is selected when the tablet terminal user inputs a closed region such as a rectangle or a circle using a stylus pen 18A which is a pen-type pointing device to designate information included in the closed region as confidential information.

The buttons 54A, 54B, and 54C corresponding to a character region, a graphic region, and a photographic region, are selected when designating a type of image region which is not displayed on the tablet terminal 10. For example, when the button 54A corresponding to the character region is selected, all of the character region included in the original image is designated as confidential information, and is not displayed on the tablet terminal 10.

When the button 52 and any of the buttons 54A, 54B, and 54C are selected at the same time, both a region manually designated by the tablet terminal user and a region corresponding to the selected type of image region are designated as confidential information, and are not displayed on the tablet terminal 10.

The communication unit 16 is a transmitting and receiving unit which is connected to the head mounted display device 20 via the network 30 and has a wireless communication function for performing transmission and reception of data. The data transmitted to the head mounted display device 20 are confidential information 44 (refer to FIG. 6).

The input information processing unit 17 is connected to the input device 18 to process data from the input device 18.

The input device 18 includes the touch panel which is also used by the operation unit 13 and the above-mentioned stylus pen 18A, and is used in an input by the tablet terminal user. A physical keyboard and a software keyboard displayed on the display device 15 can be used for the input device 18. For example, the physical keyboard is composed of instruction buttons, ten keys and direction keys (cursor keys) disposed below the display device 15. In addition, a finger of the tablet terminal user or other pointing devices can be applied instead of the stylus pen 18A.

Next, a configuration of the head mounted display device 20 will be described in detail.

Figure 9:
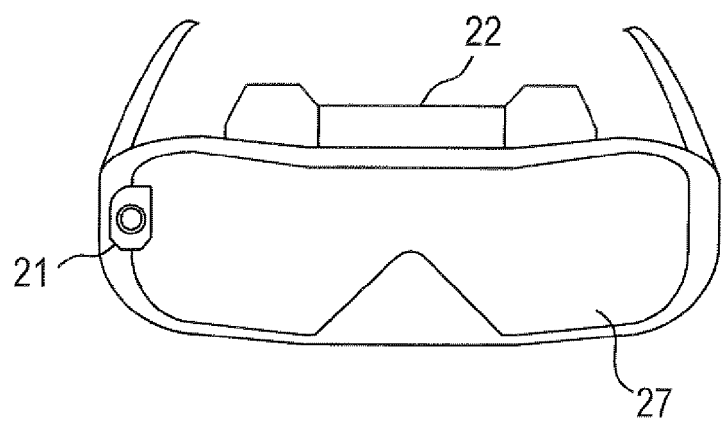
FIG. 9 is a front view of assistance in explaining a head mounted display device shown in FIG. 1.
Figure 12:
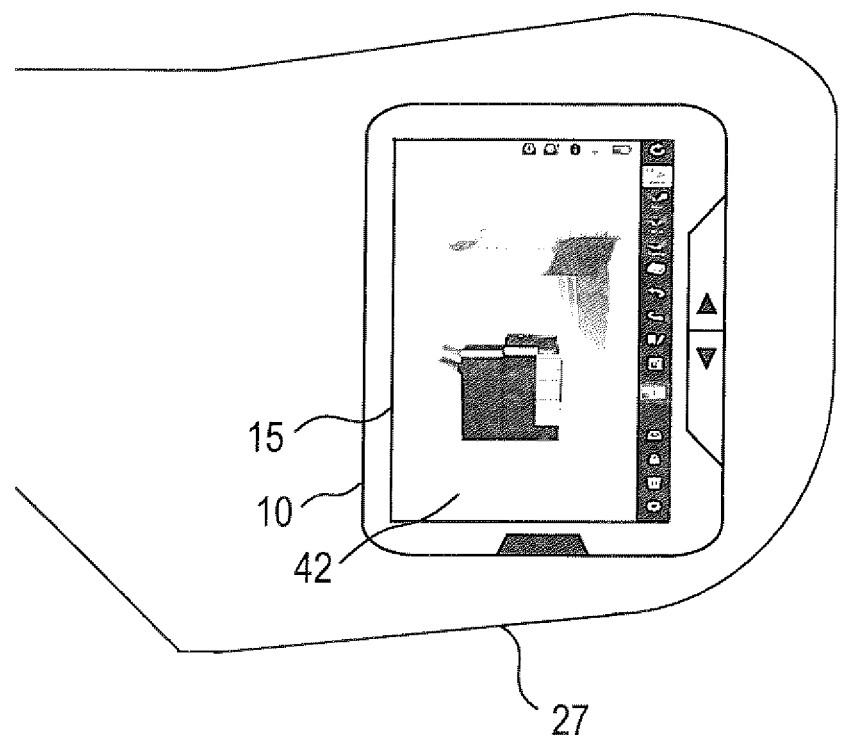
FIG. 12 is a schematic view of assistance in explaining an image passing through a glasses-type display unit shown in FIGS. 9 and 10.
Figure 13:
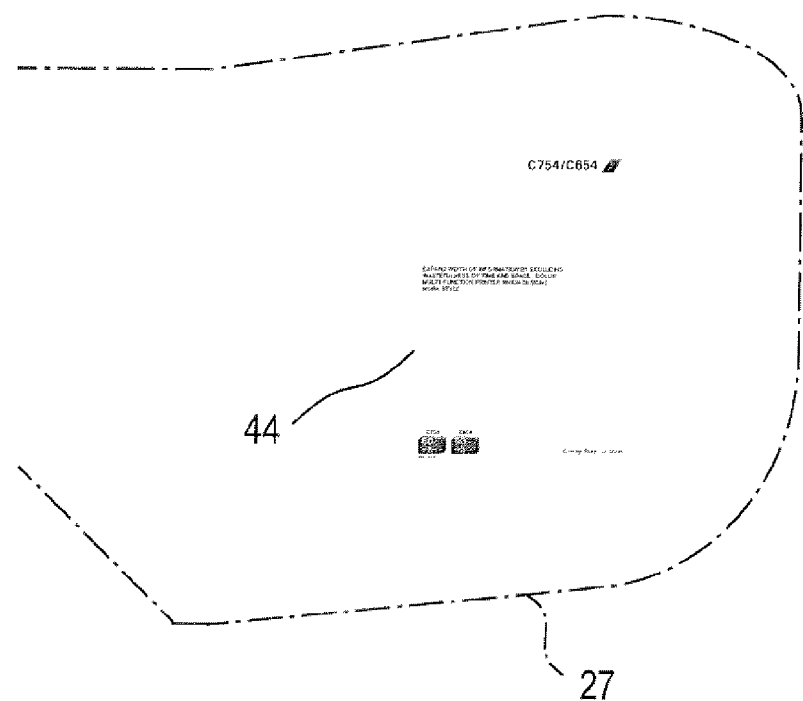
FIG. 13 is a schematic view of assistance in explaining a virtual object processing of confidential information received by a communication unit of a main body shown in FIGS. 9 and 10.
Figure 14:
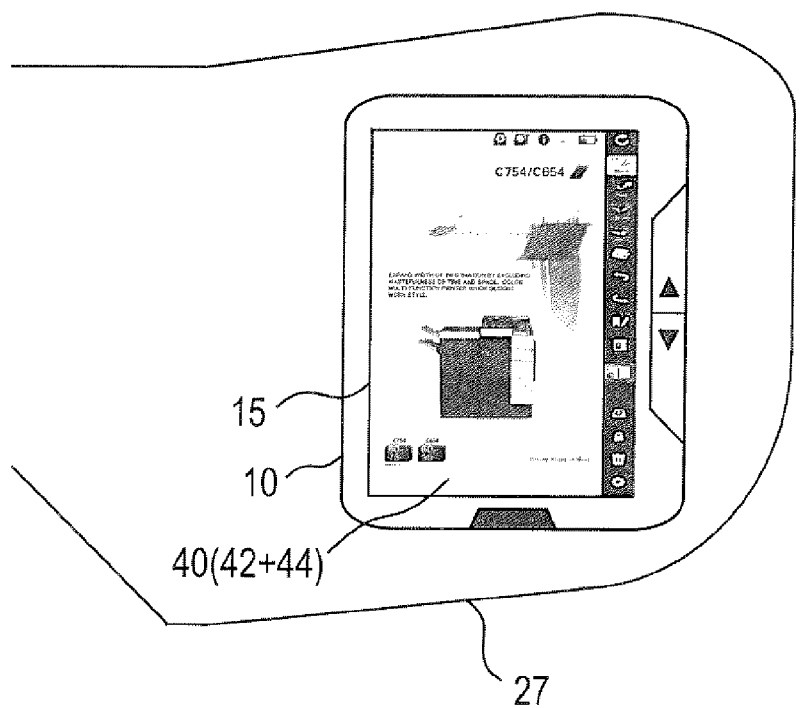
FIG. 14 is a schematic view of assistance in explaining an image visually recognized by a head mounted display device user.

FIG. 9 is a front view of assistance in explaining the head mounted display device 20 shown in FIG. 1, FIG. 10 is a block diagram of assistance in explaining the head mounted display device shown in FIG. 1, FIGS. 11 and 12 are schematic views of assistance in explaining an image captured by a video camera and an image passing through a glasses-type display unit shown in FIGS. 9 and 10, FIG. 13 is a schematic view of assistance in explaining the virtual object processing of confidential information received by the communication unit of a main body shown in FIGS. 9 and 10, and FIG. 14 is a schematic view of assistance in explaining an image visually recognized by a head mounted display device user.

The head mounted display device 20 is an optical transmission type, or an optical see-through type and includes a video camera 21, a main body 22, and a glasses-type display unit 27 as shown in FIG. 9 to be used in order to cause the non-confidential information 42 and the confidential information 44 to be visually recognized by the HMD user (a person equipped with HMD).

The video camera 21 is disposed adjacent to the glasses-type display unit 27, and is composed of an imaging device for imaging an external state that is a real space the HMD user actually views, and is used to acquire the non-confidential information 42 displayed on the display device 15 of the tablet terminal 10 as shown in FIG. 11. The video camera 21 acquires an image of the real space that the HMD user actually views by acquiring information on a viewpoint of the HMD user from a sensor (not illustrated) which is included in a display device and detects the viewpoint of the HMD user and by capturing an image corresponding to the viewpoint of the HMD user.

The main body 22 includes a system control unit 23, a data storage device 24, a communication unit 25, and an image processing unit 26 as shown in FIG. 10.

The system control unit 23 is a control circuit composed of a microprocessor that performs control of each of the above-mentioned units and various types of operation processing according to programs, etc.

The data storage device 24 is used to store various types of programs and data and is composed of an appropriate combination of a read-only memory (ROM), a random access memory (RAM), a rewritable non-volatile semiconductor memory (for example, flash memory), and the like. For example, a program stored in the ROM is read out by the system control unit 23 (microprocessor) as needed and is executed. At this time, the RAM is used as a working area which temporarily stores the program and data necessary for executing the program. For example, the program is the display program 24A executed by the system control unit 23.

The display program 24A is a program for causing the confidential information 44 transmitted from the tablet terminal 10 and the real space (non-confidential information 42) to be superimposed and viewed by the HMD user. More specifically, the display program 24A in cooperation with the image processing unit 26 to be described below calculates a display position of the confidential information 44 in the glasses-type display unit 27, and the like based on an image (an image of the display device 15 of the tablet terminal 10) of the real space captured by the video camera 21, and causes the confidential information 44 and the real space (the non-confidential information 42) to be superimposed and viewed by the HMD user. Therefore, the HMD user can confirm the content of document data in the same manner as when viewing the original image by viewing the confidential information 44 and the real space (the non-confidential information 42) which are superimposed.

The communication unit 25 is a transmitting and receiving unit which is connected to the tablet terminal 10 via the network 30 and has a wireless communication function for performing the transmission and reception of data. The received data are the confidential information 44 (refer to FIG. 6) transmitted from the tablet terminal 10.

The image processing unit 26 is used to perform virtual object processing on the received confidential information 44.

The virtual object processing is processing which converts the confidential information 44 using an Augmented Reality (AR) technology which generates a virtual image so that, when a virtual image is superimposed onto an image of the display device 15 of the tablet terminal 10 which is captured by the video camera 21, the confidential information is correctly associated with the non-confidential information 42 included in the image.

For example, by adjusting the shape and the size of the confidential information 44 according to the shape and the size of the non-confidential information 42 of the image, or by adjusting the position of the confidential information 44 according to the position (coordinates) of the non-confidential information 42 of the image, the confidential information 44 is aligned.

For example, the glasses-type display unit 27 includes a prism or a half mirror of an optical multilayer film, and is adapted to display the confidential information 44 (refer to FIG. 13) on which the virtual object processing has been performed by the image processing unit 26 and to allow viewing of the real space in a see-through mode.

The real space (refer to FIG. 12) visually recognized through the glasses-type display unit 27 corresponds to an image captured by the video camera 21, and the confidential information 44 displayed on the glasses-type display unit 27 on which the virtual object processing is performed (refer to FIG. 13).

Therefore, the confidential information 44 is displayed on the glasses-type display unit 27 as if the confidential information 44 is aligned and synthesized with the non-confidential information 42 visually recognized through the glasses-type display unit 27. That is, as shown in FIG. 14, the HMD user can visually recognize an image in which the confidential information 44 associated with the non-confidential information 42 is displayed on the display device 15 of the tablet terminal 10 in a correct positional relationship, and confirm the content of document data in the same manner as when viewing the original image.

The head mounted display device 20 is not limited to an optical transmission type, but a video transmission type, that is, a video see-through type, can be applied thereto. In this case, since an image of the real space is not seen through the glasses-type display unit 27, an image in which the confidential information 44 after the virtual object processing is aligned and synthesized with an image captured by the video camera 21 is displayed on the glasses-type display unit 27.

Next, a display method according to the embodiment of the present invention will be described.

Figure 15:
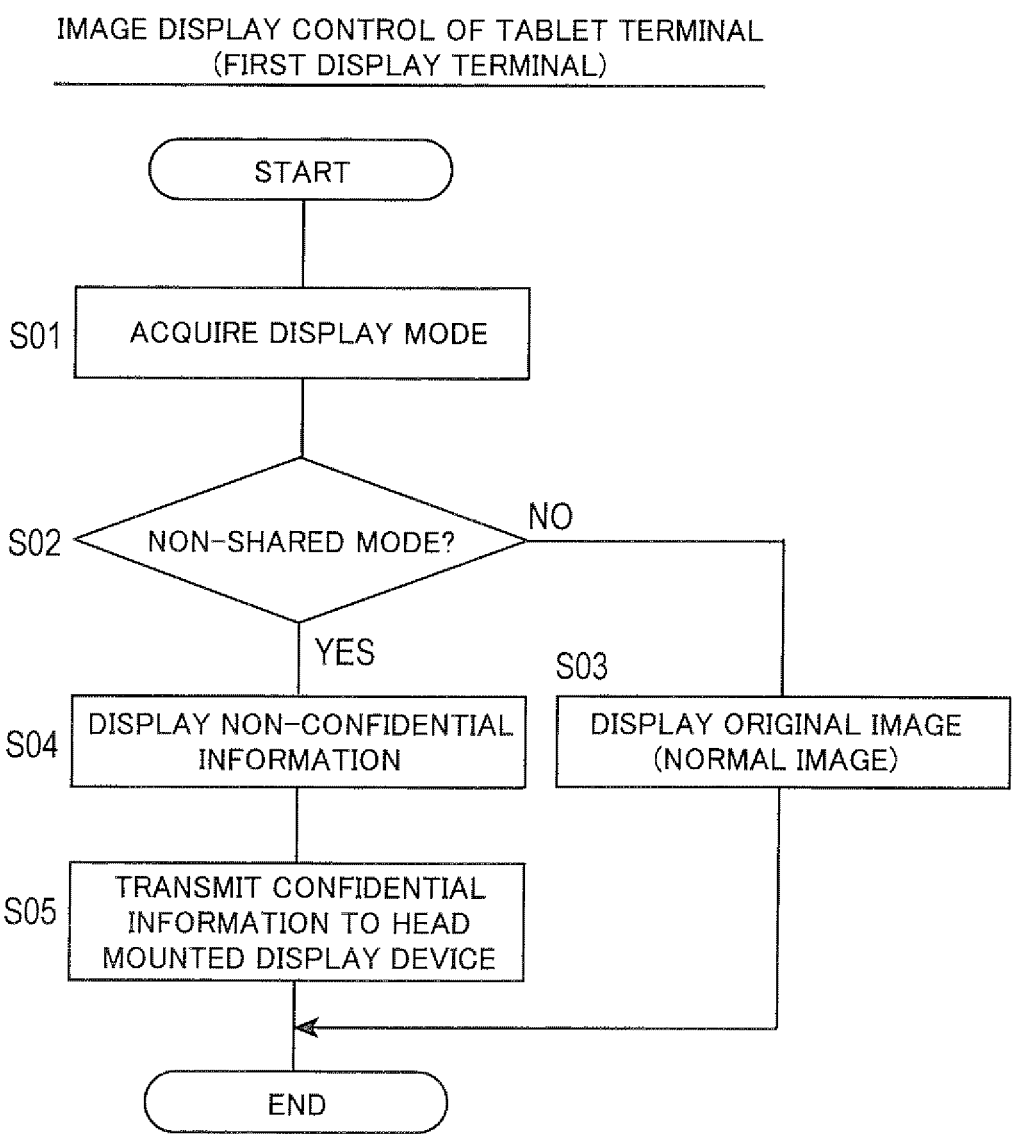
FIG. 15 is a flowchart of assistance in explaining a display control of a tablet terminal in a display method according to the embodiment of the present invention.

FIG. 15 is a flowchart of assistance in explaining display control of the tablet terminal in a display method according to the embodiment of the present invention. An algorithm displayed by the flowchart shown in FIG. 15 is stored as the display program 12A incorporated with the image determination program 12B in the data storage device 12, and executed by the system control unit 11.

First, a display mode is acquired in the tablet terminal 10 (step S01). The display mode includes a non-shared mode in which the confidential information is included in the original image 40, and a shared mode in which the confidential information is not included in the original image 40 (constituted with only non-confidential information which a third party is allowed to browse).

Then, it is determined whether the acquired display mode is the non-shared mode or not (step S02).

When the acquired display mode is determined to be the non-shared mode (YES in step S02), the non-confidential information 42 stored in the data storage device 12 is read out and displayed on the display device 15 based on a region attribute (step S04). Thereafter, the confidential information 44 which is stored in the data storage device 12 is read out, and transmitted to the head mounted display device 20 via the network 30 by the communication unit 16 (step S05), and thereby the process is terminated.

On the other hand, when the acquired display mode is determined not to be the non-shared mode (NO in step S02), the original image 40 stored in the data storage device 12 is read out and displayed on the display device 15 (step S03), and thereby the process is terminated.

In the tablet terminal 10, as described above, the non-confidential information (the original image 40 in the shared mode and the non-confidential information 42 in the non-shared mode) is displayed on the display device 15 which allows a third party to browse, such that it is possible for the third party to clearly visually recognize the non-confidential information in the same manner as a concerned party. Therefore, the concerned party and the third party can share the non-confidential information (the original image 40 in the shared mode and the non-confidential information 42 in the non-shared mode).

The original image 40, the non-confidential information 42, and the confidential information 44 are not limited to being stored in advance in the data storage device 12. For example, it is possible to synthesize the original image 40 from the non-confidential information 42 and the confidential information 44, and to extract the non-confidential information 42 from the original image 40 based on a region attribute when displaying the non-confidential information 42 on the display device 15 or when transmitting the non-confidential information 42 to the head mounted display device 20.

Next, an operation of the head mounted display device will be described.

Figure 16:
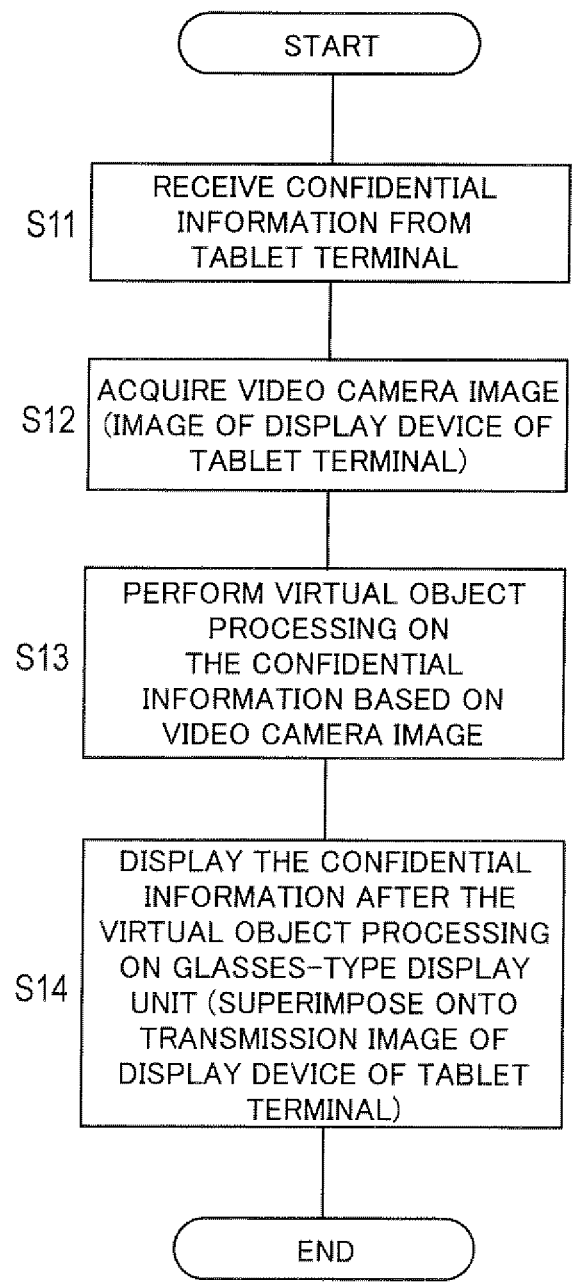
FIG. 16 is a flowchart of assistance in explaining a display control of the head mounted display device in the display method according to the embodiment of the present invention.

FIG. 16 is a flowchart of assistance in explaining display control of the head mounted display device in a display method according to the embodiment of the present invention. An algorithm shown by the flowchart shown in FIG. 16 is stored as the display program 24A in the data storage device 24, and executed by the system control unit 23.

In the head mounted display device 20, first, the confidential information 44 transmitted from the tablet terminal 10 is received by the communication unit of the main body 22 via the network 30 (step S11), and an image of the real space which the HMD user actually views is acquired by the video camera 21 (step S12). The image of the real space includes an image of the display device 15 of the tablet terminal 10.

Then, the virtual object processing is performed on the confidential information 44 (step S13). Accordingly, the confidential information 44 is converted so that consistency is assured when the confidential information 44 is superimposed onto the non-confidential information (non-confidential information displayed on the display device 15 of the tablet terminal 10) 42 included in an image of the real space through the glasses-type display unit 27.

The confidential information 44 which has been converted by the virtual object processing is displayed on the glasses-type display unit 27 (step S14), and the process is terminated. At this time, the HMD user visually recognizes an image in which the image of the real space through the glasses-type display unit 27 and the confidential information 44 converted by the virtual object processing are superimposed on each other. That is, the HMD user can visually recognize an image in which the non-confidential information 42 and the confidential information 44 are displayed on the display device 15 of the tablet terminal 10, and confirm the content of document data in the same manner as when viewing the original image.

In the head mounted display device 20, as described above, the confidential information 44 is displayed on the glasses-type display unit 27 which does not allow a third party to browse, such that the confidential information can be clearly visually recognized by the concerned party, and on the other hand, be secret to the third party. Therefore, the concerned party can occupy the confidential information.

Next, a region attribute setting operation of the tablet terminal will be described.

Figure 17:
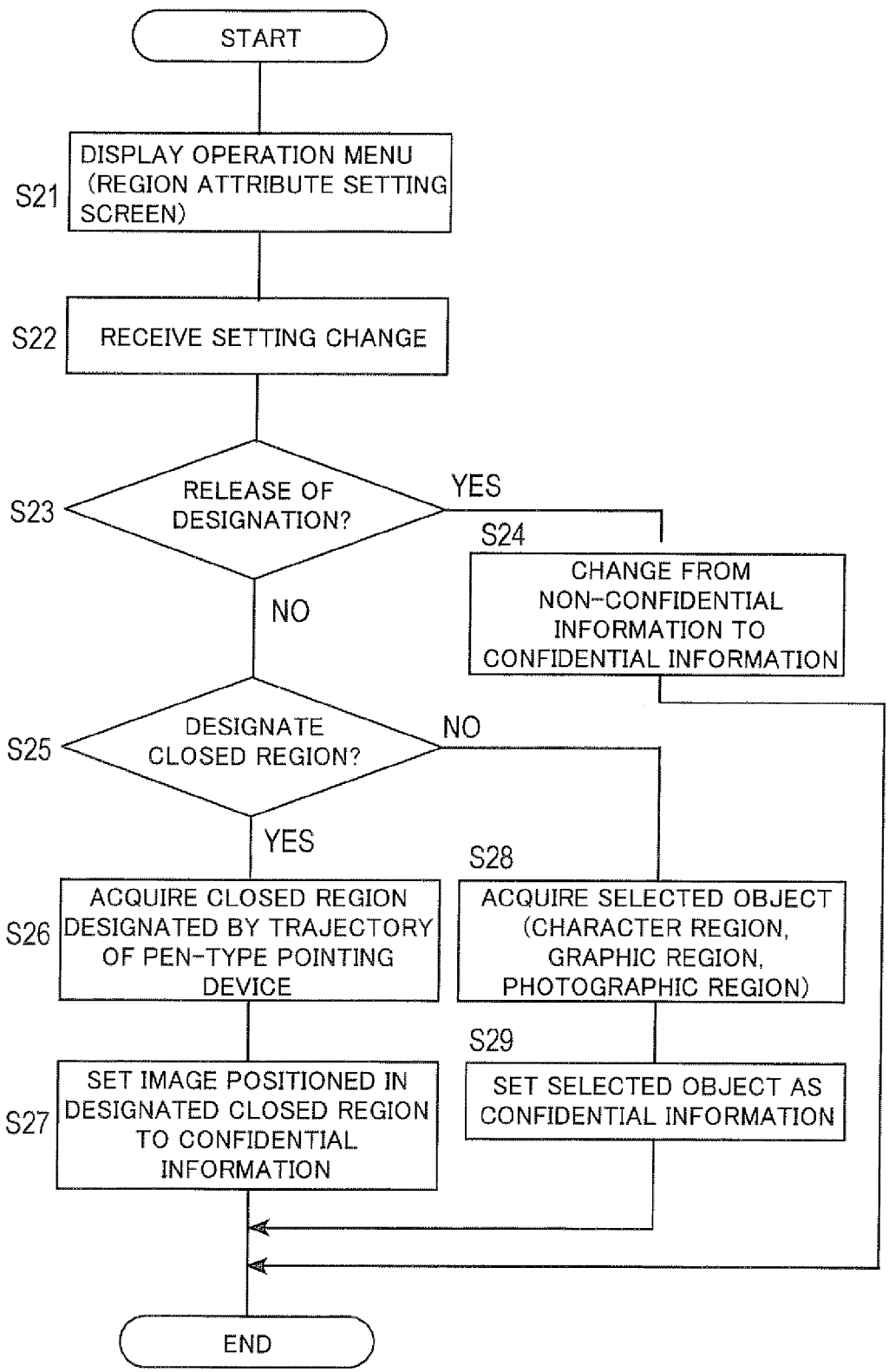
FIG. 17 is a flowchart of assistance in explaining a region attribute setting in the display method according to the embodiment of the present invention.

FIG. 17 is a flowchart of assistance in explaining a region attribute setting in the display method according to the embodiment of the present invention. An algorithm shown by the flowchart shown in FIG. 17 is stored in the data storage device 12 as the region attribute setting program 12C, and executed by the system control unit 11.

In order to set a condition for determining which information among the information included in the original image to set as confidential information, that is, which information not to display on the tablet terminal 10, first, a region attribute setting display screen 50 (refer to FIGS. 7 and 8) of an operation menu is displayed on the tablet terminal 10 according to an instruction by the stylus pen 18A of the tablet terminal user (step S21), and a setting change of a region attribute using the buttons 52 and 54A to 54C is received (step S22). Then, it is determined whether the setting change means a release of designation, that is, a change from the non-shared mode to the shared mode, or not (step S23).

When the setting change is determined to mean a release of designation by removal of a check in buttons 52 or 54A to 54C (YES in step S23), designation-released information among the information included in the confidential information is changed to non-confidential information (step S24). More specifically, the designation-released information among information previously designated not to be displayed by means of a closed region using the button 52, and objects (the character region, the graphic region, the photographic region) corresponding to the type of image region, which was previously designated not to be displayed using the buttons 54A to 54C are changed to non-confidential information. Then, the process is terminated. Accordingly, the designation-released information among the information included in confidential information is displayed on the display device 15 of the tablet terminal 10 as the non-confidential information.

When the setting change is determined not to mean a release of designation (NO in step S23), it is determined whether the setting change means a designation of the closed region or not (step S25).

When the setting change is determined to mean the designation of the closed region based on addition of a check to the button 52 (YES in step S25), the closed region designated by, for example, a trajectory of the stylus pen 18A, is acquired (step S26). Then, an image positioned in the designated closed region (information included in the closed region) is set to the confidential information (step S27), and the process is terminated. Accordingly, the image positioned in the designated closed region is not displayed on the display device 15 of the tablet terminal 10, and is transmitted to the head mounted display device 20 as the confidential information.

When the setting change is determined not to mean the designation of the closed region (the setting change means a designation of an object) (NO in step S25), an object (the character region, the graphic region, the photographic region) corresponding to a type of image region, which is selected by adding a check to the buttons 54A to 54C, is acquired (step S28). Then, the object corresponding to the selected type of image region is set to confidential information (step S29), and the process is terminated. Accordingly, the object corresponding to the selected type of image region is not displayed on the display device 15 of the tablet terminal 10, and is transmitted to the head mounted display device 20 as confidential information.

The setting target of the region attribute is not limited to an object included in an image currently displayed on the display device 15 of the tablet terminal 10, and the like but can be all of the document data included in the image or a portion (a plurality of pages) of the document data.

Next, modifications 1 to 3 according to the embodiment of the present invention will be sequentially described.

Figure 18:
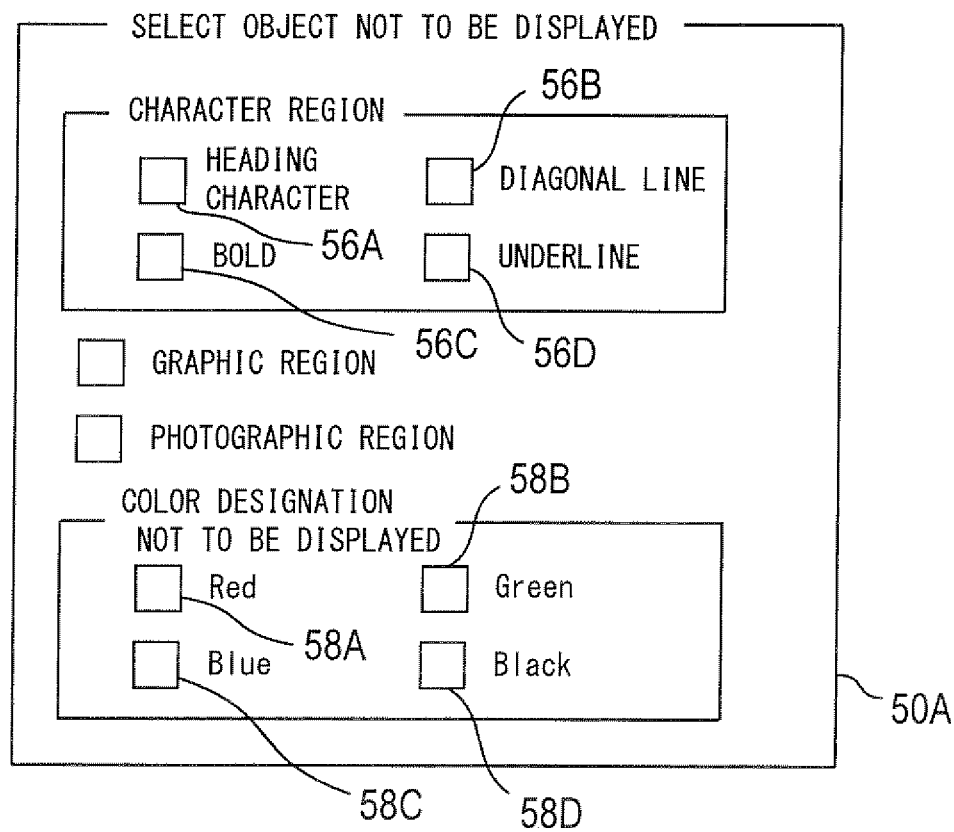
FIG. 18 is a diagram of assistance in explaining a modification 1 according to the embodiment of the present invention.

FIG. 18 is a diagram of assistance in explaining a modification 1 according to the embodiment of the present invention.

The region attribute setting display screen of the operation menu is not limited to the form shown in FIG. 8, but it is possible to dispose, for example, buttons 56A to 56D for subdividing and selecting the attributes of a character region not to be displayed or buttons 58A to 58D for selecting an object by means of color designation as shown in FIG. 18. The buttons 56A, 56B, 56C, and 56D correspond to a caption character, a diagonal line, bold, and an underline, and the buttons 58A, 58B, 58C, and 58D correspond to red, green, blue, and black. A unit for subdividing the attributes of a character region and a unit for subdividing color are not limited to the above-mentioned configuration.

For example, when only the button 56A is selected among buttons 56A, 56B, 56C, and 56D, only a caption character among the information included in the character region becomes confidential information. Moreover, in the above-mentioned situation, when the button 58A is further selected in addition to the button 56A, only characters in red becomes confidential information among the caption characters. Combinations other than the above-mentioned combination are performed in the same manner as in the above, such that description thereof will be omitted.

Figure 19:
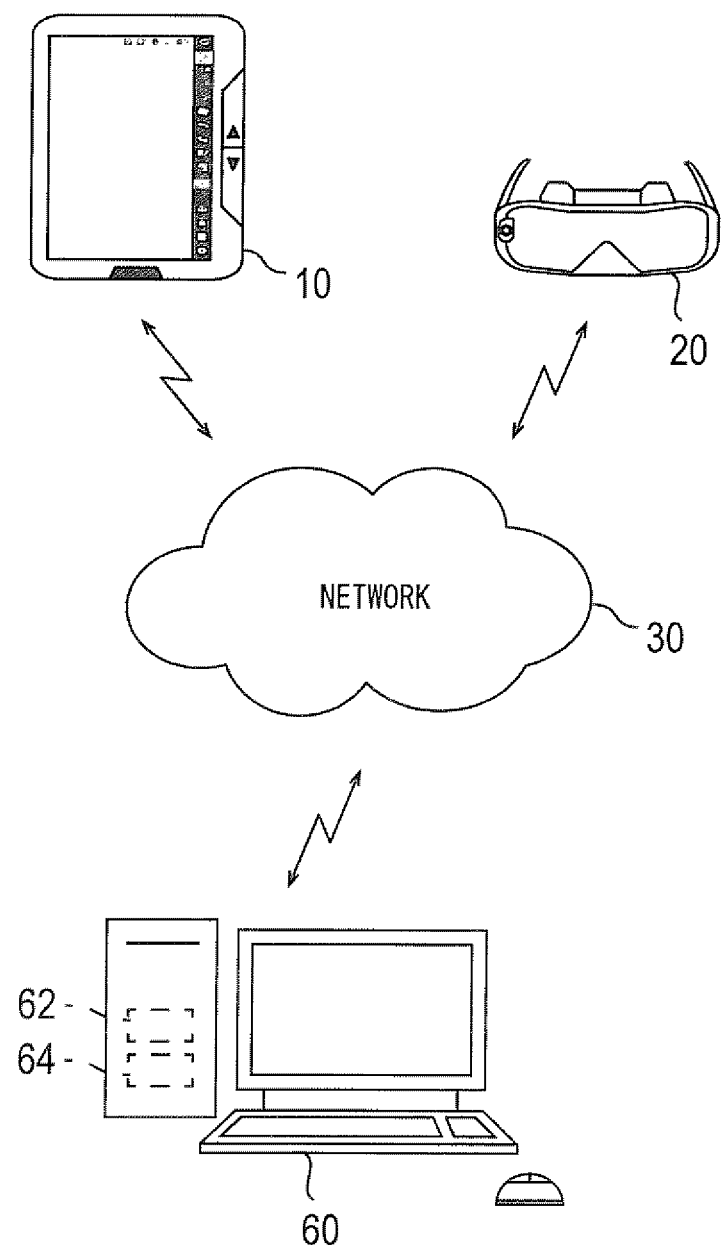
FIG. 19 is a schematic view of assistance in explaining a modification 2 according to the embodiment of the present invention.

FIG. 19 is a schematic view of assistance in explaining a modification 2 according to the embodiment of the present invention.

The region attribute setting is not limited to a setting performed on the tablet terminal 10, but can be a setting performed on a server 60 which is a host computer connected to the network 30 as shown in FIG. 19. In this case, the server 60 is provided with a communication unit (transmitting unit) 62 connected to the network 30 and a region attribute setting program 64 and, for example, a region attribute setting which is designated (selected) in the server 60 by using the region attribute setting display screen 50A shown in FIG. 18 is transmitted to the tablet terminal 10 which is a client via the network 30.

Figure 20:
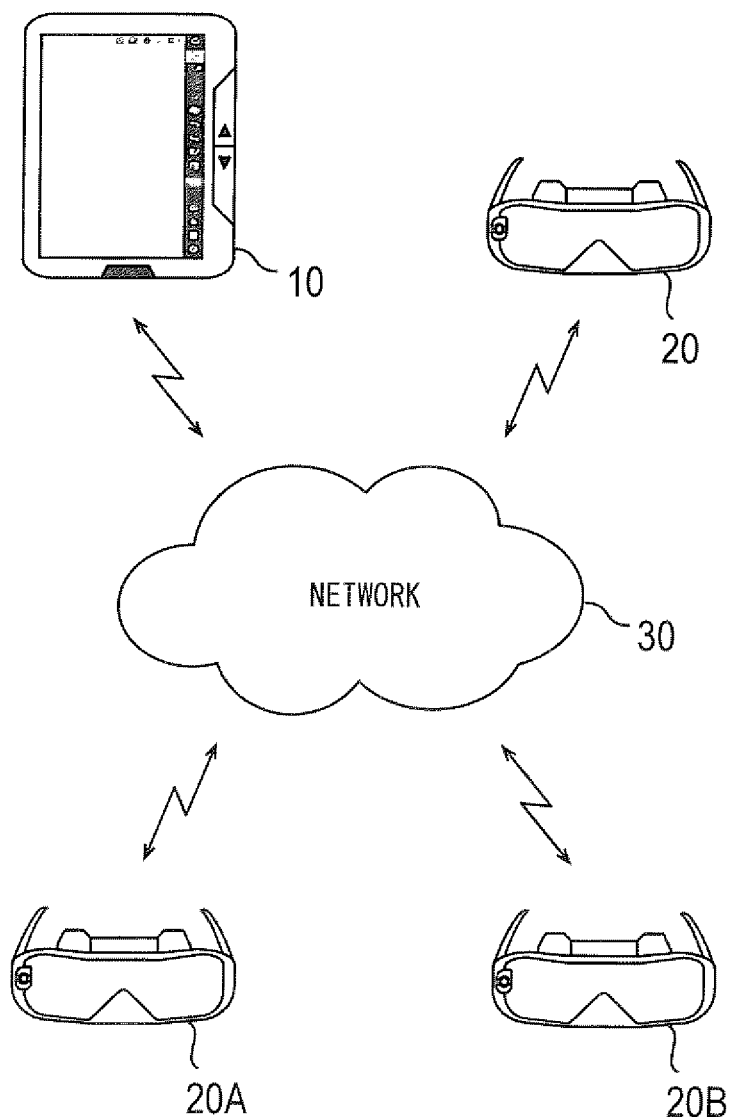
FIG. 20 is a diagrammatic illustration of assistance in explaining a modification 3 according to the embodiment of the present invention.
Figure 21:
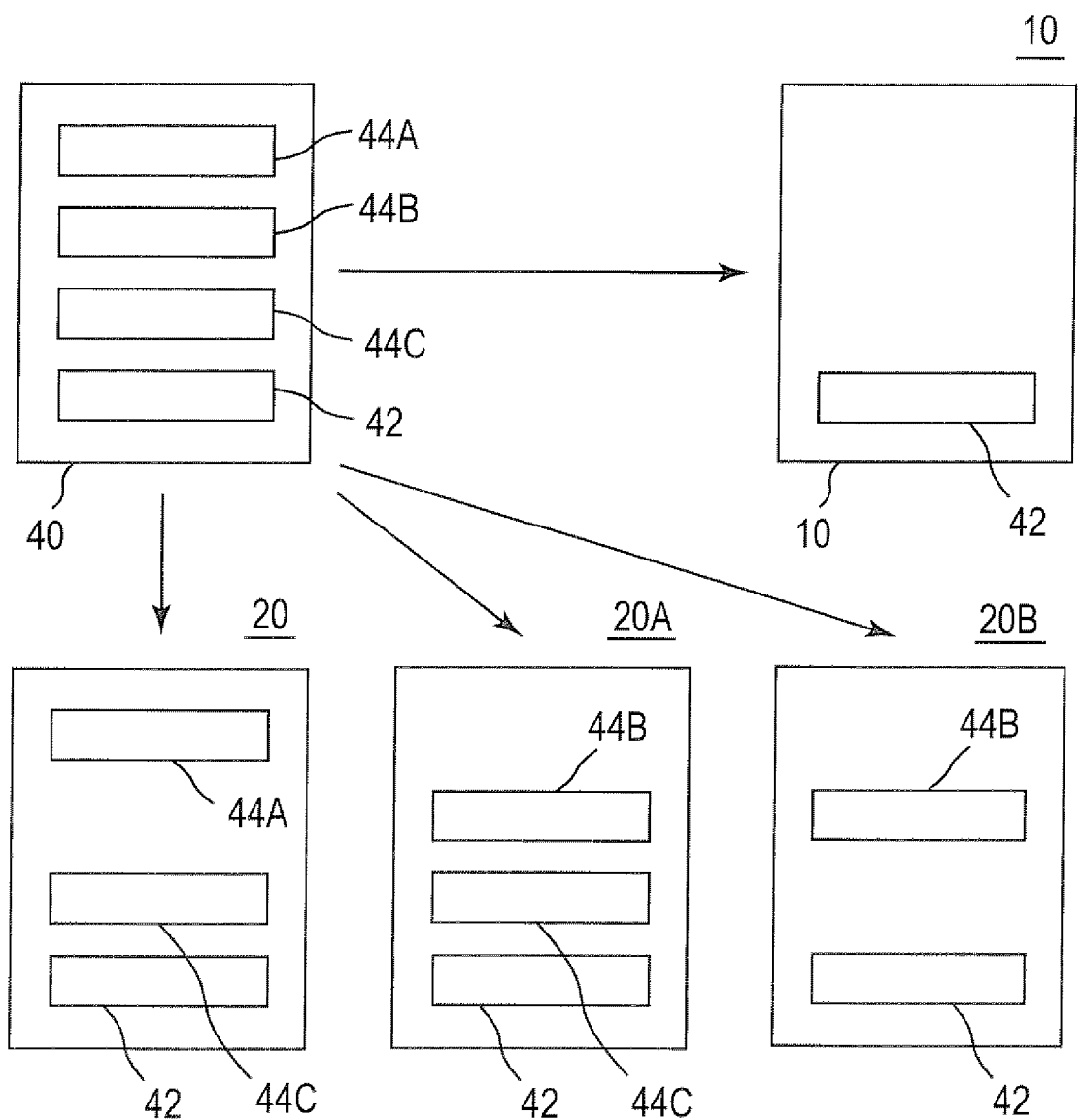
FIG. 21 is a schematic view of assistance in explaining a visually recognized image in a head mounted display device shown in FIG. 20.

FIG. 20 is a diagrammatic illustration of assistance in explaining a modification 3 according to the embodiment of the present invention, and FIG. 21 is a schematic view of assistance in explaining a visually recognized image in the tablet terminal and the head mounted display device shown in FIG. 20.

The display system according to the embodiment of the present invention can be provided with e a plurality of head mounted display devices 20, 20A, and 20B as shown in FIG. 20. In this case, different pieces of confidential information selected from a plurality of pieces of confidential information 44A to 44C included in the original image 40 are transmitted to the head mounted display devices 20, 20A, and 20B, respectively.

For example, in an illustration shown in FIG. 21, the HMD user visually recognizes an image in which the confidential information 44A, the confidential information 44C and the non-confidential information 42 are superimposed on each other, a user of the head mounted display device 20A visually recognizes an image in which the confidential information 44B, the confidential information 44C and the non-confidential information 42 are superimposed on each other, and a user of the head mounted display device 20B visually recognizes an image in which the confidential information 44B and the non-confidential information 42 are superimposed on each other. When necessary, it is possible to transmit identical confidential information to the head mounted display devices 20, 20A, and 20B.

As described above, since a display unit which allows a third party to browse is independent from a display unit which does not allow the third party to browse, and the contents of displays are distinguished from each other in the present embodiment, confidential information is secret to the third party, and can be clearly visually recognized by the concerned party. In addition, non-confidential information can be clearly visually recognized by the third party in the same manner as the concerned party. In other words, the confidential information can be occupied by the concerned party and the non-confidential information can be shared between the concerned party and the third party.

The present invention is not limited to the above-mentioned embodiment, but can be variously modified in the scope of the appended claims. For example, the first display terminal is not limited to the tablet terminal, but a laptop computer or a desktop computer can be applied thereto. In addition, the second display terminal is not limited to the head mounted display device, but a camera-equipped tablet terminal and a camera-equipped portable terminal can be applied thereto.

The means, the method, and the programs according to the present invention can be realized by a dedicated hardware circuit. Moreover, when realizing the present invention using a programmed display terminal, a program which causes the display terminal to operate can be provided by means of a computer-readable recording medium such as a USB memory, a Compact Disc Read Only Memory (CD-ROM), and the like, or can be provided not by means of a recording medium but on-line through a network such as the Internet and the like. In this case, a program is usually transmitted and stored in the data storage device of the display terminal. In addition, the program may be provided as single application software, and can be incorporated into software of the display terminal as a function of the display terminal.

What is claimed is:

1. A display system for displaying a document comprising a first display terminal and a second display terminal,
   wherein said first display terminal comprises:
      a first display which does not display confidential information that a first user is not allowed to browse, but displays non-confidential information that the first user is allowed to browse with regard to the document; and
      a first hardware processor which executes a process of determining whether an image and/or an object is the confidential information or not, based on determining whether the image and/or the object is a predetermined region attribute or not, and transmitting the image and/or the object which has been determined to be confidential information to said second display terminal as the confidential information,
   said second display terminal comprises:
      a second display which does not allow the first user to browse, but allows a second user who is different from the first user to browse; and
      a second hardware processor which executes a process of receiving the confidential information, and acquiring the non-confidential information displayed on said first display,
   wherein said second display, based on the acquired non-confidential information, displays the received confidential information so that the received confidential information is visually recognized by the second user in a state of being aligned with the non-confidential information displayed on said first display, said second display is an optical transmission type or a video transmission type, and displays an image synthesized by aligning the acquired non-confidential information with the confidential information, and said region attribute of the image and/or the object designates a character, a given character, a graphic, a photograph, color, an underline, or a combination of at least two thereof.

2. The display system according to claim 1, wherein said first hardware processor designates the region attribute.

3. The display system according to claim 2, wherein said region attribute is designated by said first hardware processor using a character, a given character, a graphic, a photograph, color, an underline, or a combination of at least two thereof.

4. The display system according to claim 2, wherein said first hardware processor accepts an input of information with respect to the region attribute from a user and designates the region attribute based on the input information.

5. The display system according to claim 1, further comprising a server which is so connected to said first display terminal that said server and said first display terminal can communicate with each other,
wherein said server designates the region attribute and transmits the designated region attribute to said first display terminal.

6. The display system according to claim 1, wherein said second display terminal is a head mounted display device.

7. The display system according to claim 1, wherein said second display terminal further comprises a camera and said second hardware processor acquires the non-confidential information captured by said camera.

8. A display method for displaying a document using a first display terminal and a second display terminal, comprising the steps of:
displaying non-confidential information on a first display of said first display terminal which does not display confidential information that a first user is not allowed to browse, but displays the non-confidential information that the first user is allowed to browse with regard to the document;
executing, performed by a first hardware processor of said first display terminal, a process of determining whether an image and/or an object is the confidential information or not, based on determining whether the image and/or the object is a predetermined region attribute or not, and transmitting the image and/or the object which has been determined to be confidential information to said second display terminal as the confidential information;
executing, performed by a second hardware processor of said second display terminal, a process of receiving the confidential information, and acquiring the non-confidential information displayed on said first display; and
displaying the received confidential information on a second display of said second display terminal which does not allow the first user to browse but allows a second user different from the first user to browse,
wherein, in said step of displaying the received confidential information on the second display, the received confidential information is displayed so that the received confidential information is visually recognized by the second user in a state of being aligned with the non-confidential information displayed on said first display based on the acquired non-confidential information, the second display is an optical transmission type or a video transmission type, and displays an image synthesized by aligning the acquired non-confidential information with the confidential information, and
said region attribute of the image and/or the object designates a character, a given character, a graphic, a photograph, color, an underline, or a combination of at least two thereof.

9. The display method according to claim 8, wherein said second display terminal further a camera and said second hardware processor acquires the non-confidential information captured by said camera.

10. A display terminal, which is applied to a display system comprising a first display terminal and a second display terminal, for displaying a document as the first display terminal, the display terminal comprising:
a first display which does not display confidential information that a first user is not allowed to browse, but displays non-confidential information that the first user is allowed to browse with regard to the document; and
a first hardware processor which executes a process of determining whether an image and/or an object is the confidential information or not, based on determining whether the image and/or the object is a predetermined region attribute or not, and transmitting the image and/or the object which has been determined to be confidential information to a terminal device, which is said second display terminal, as the confidential information,
wherein said terminal device comprises:
a second display which does not allow the first user to browse, but allows a second user who is different from the first user to browse; and
a second hardware processor which executes a process of receiving the confidential information, and acquiring the non-confidential information displayed on said first display, and
wherein said second display, based on the acquired non-confidential information, displays the received confidential information so that the received confidential information is visually recognized by the second user in a state of being aligned with the non-confidential information displayed on said first display, said second display is an optical transmission type or a video transmission type, and displays an image synthesized by aligning the acquired non-confidential information with the confidential information, and
said region attribute of the image and/or the object designates a character, a given character, a graphic, a photograph, color, an underline, or a combination of at least two thereof.

11. The display terminal according to claim 10, said first hardware processor designates the region attribute.

12. The display terminal according to claim 11, wherein said region attribute is designated by said first hardware processor using a given character, a graphic, a photograph, color, an underline, or a combination of at least two thereof.

13. The display terminal according to claim 11, wherein said first hardware processor accepts an input of information with respect to the region attribute from a user and designates the region attribute based on the input information.

14. The display terminal according to claim 10, wherein said display system further comprises a server that designates the region attribute, wherein the display terminal receives the region attribute designated by said server and transmitted from said server.

15. The display terminal according to claim 10, wherein said terminal device further comprises a camera and said second hardware processor acquires the non-confidential information captured by said camera.

16. A non-transitory computer-readable recording medium stored with a display program of a display terminal, which is applied to a display system comprising a first display terminal and a second display terminal, for displaying a document as the first display terminal, said display program causing said display terminal to execute a process, wherein said process comprising the procedures of:

(A) determining whether an image and/or an object is the confidential information or not, by a first hardware processor of said display terminal, based on determining whether the image and/or the object is a predetermined region attribute or not;

(B) displaying, with regard to the document, the image and/or the object determined not to be confidential information, by said first hardware processor, on a first display of said display terminal which does not display the confidential information that a first user is not allowed to browse but displays the non-confidential information that the first user is allowed to browse as the non-confidential information; and (C) transmitting the image and/or the object which is determined to be confidential information to a terminal device which is the second display terminal by said first hardware processor of the display terminal as confidential information, wherein said terminal device comprises a second display which does not allow the first user to browse, but allows a second user different from the first user to browse, and a second hardware processor which executes a process of receiving the confidential information, and acquiring the non-confidential information displayed on said first display, and wherein said second display, based on the acquired non-confidential information, displays the received confidential information so that the received confidential information is visually recognized by the second user in a state of being aligned with the non-confidential information displayed on said first display, said second display is an optical transmission type or a video transmission type, and displays an image synthesized by aligning the acquired non-confidential information with the confidential information, and said region attribute of the image and/or the object designates a character, a given character, a graphic, a photograph, color, an underline, or a combination of at least two thereof.

17. The non-transitory computer-readable recording medium according to claim 16, wherein said process of determining whether the image and/or the object is the confidential information or not is performed according to the region attribute by means of said first hardware processor.

18. The non-transitory computer-readable recording medium according to claim 17, wherein said display system further comprises a server that designates the region attribute, wherein said process further comprises a procedure of receiving the region attribute designated by said server and transmitted from said server by means of a receiving unit of said display terminal.

19. The non-transitory computer-readable recording medium according to claim 17, wherein said process further comprises a procedure of designating the region attribute by means of a region attribute designation unit of said display terminal.

20. The non-transitory computer-readable recording medium according to claim 19, wherein said region attribute is designated by using a character, a given character, a graphic, a photograph, color, an underline, or a combination of at least two thereof.

21. The non-transitory computer-readable recording medium according to claim 19, wherein said procedure of designating the region attribute includes said first hardware processor accepting an input of information with respect to the region attribute from a user and designating the region attribute based on the input information.

22. The non-transitory computer-readable recording medium according to claim 16, wherein said terminal device further comprises a camera and said second hardware processor acquires the non-confidential captured by said camera.

* * * * *